United States Patent
Tan et al.

(10) Patent No.: US 12,418,873 B2
(45) Date of Patent: Sep. 16, 2025

(54) METHODS AND SYSTEMS FOR PROPAGATION DELAY COMPENSATION IN WIRELESS COMMUNICATION NETWORKS

(71) Applicant: ZTE Corporation, Guangdong (CN)

(72) Inventors: Jie Tan, Shenzhen (CN); Xiubin Sha, Shenzhen (CN); Bo Dai, Shenzhen (CN); Ting Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 397 days.

(21) Appl. No.: 18/164,778

(22) Filed: Feb. 6, 2023

(65) Prior Publication Data

US 2023/0262635 A1    Aug. 17, 2023

Related U.S. Application Data

(63) Continuation of application No. PCT/CN2020/107374, filed on Aug. 6, 2020.

(51) Int. Cl.
H04W 56/00 (2009.01)
H04W 28/02 (2009.01)
H04W 80/06 (2009.01)

(52) U.S. Cl.
CPC ... *H04W 56/0045* (2013.01); *H04W 28/0268* (2013.01); *H04W 80/06* (2013.01)

(58) Field of Classification Search
CPC ............... H04L 5/14; H04L 27/26025; H04W 56/0045; H04W 28/0268; H04W 80/06; H04W 72/23; H04W 8/24; H04W 48/08; H04W 74/004; Y02D 30/70
See application file for complete search history.

(56) References Cited

U.S. PATENT DOCUMENTS

| | | | |
|---|---|---|---|
| 11,184,869 B2 * | 11/2021 | Abedini | H04W 56/0015 |
| 11,369,005 B2 * | 6/2022 | Abedini | H04W 64/003 |
| 11,974,246 B2 | 4/2024 | Liu et al. | |
| 12,114,279 B2 * | 10/2024 | Chien | H04W 56/004 |
| 2013/0244640 A1 * | 9/2013 | Viorel | H04W 56/0045 455/422.1 |
| 2014/0369389 A1 | 12/2014 | Sang et al. | |

(Continued)

FOREIGN PATENT DOCUMENTS

| | | |
|---|---|---|
| CN | 109451845 A | 3/2019 |
| CN | 109644109 A | 4/2019 |

(Continued)

OTHER PUBLICATIONS

QUALCOMM Incorporated, "Discussion of RAN1 LS on propagation delay compensation and way forward," 3GPP TSG RAN WG2 #107bis, Chongqing, China, R2-1913645, 3 pages, Oct. 14-18, 2019.

(Continued)

*Primary Examiner* — Bailor C Hsu
(74) *Attorney, Agent, or Firm* — Perkins Coie, LLP

(57) ABSTRACT

Disclosed are devices, systems and methods for propagation delay compensation in wireless communications. In some implementations, a data communication method includes receiving, by a mobile device, reference time information; and performing, upon determination that the mobile device has a capability for a propagation delay compensation, by the mobile device, the propagation delay compensation on the reference time information.

8 Claims, 22 Drawing Sheets

(56) References Cited

U.S. PATENT DOCUMENTS

| | | | |
|---|---|---|---|
| 2019/0053182 A1 | 2/2019 | Choi et al. | |
| 2019/0053193 A1 | 2/2019 | Park et al. | |
| 2020/0128539 A1* | 4/2020 | Abedini | H04W 56/0045 |
| 2020/0260394 A1* | 8/2020 | Wang | H04W 56/0015 |
| 2020/0322908 A1* | 10/2020 | Prakash | H04W 56/004 |
| 2021/0153145 A1* | 5/2021 | Abedini | H04W 72/542 |
| 2022/0240208 A1* | 7/2022 | Chien | H04W 56/004 |
| 2024/0381182 A1* | 11/2024 | Liu | H04L 5/0048 |

FOREIGN PATENT DOCUMENTS

| | | |
|---|---|---|
| WO | 2018039519 A1 | 3/2018 |
| WO | 2019029372 A1 | 2/2019 |

OTHER PUBLICATIONS

Nokia et al., "Remaining issues for accurate reference time delivery," 3GPP TSG RAN WG2 #107bis, Chongqing, China, R2-1913451, 5 pages, Oct. 14-18, 2019.

Ericsson, "TP of PDU session resource," 3GPP TSG RAN WG3 #ad-hoc2, Qingdao, China, R3-172505, 3 pages, Jun. 27-29, 2017.

International Search Report and Written Opinion for International Application No. PCT/CN2020/107374, mailed on Apr. 26, 2021 (7 pages).

Office Action for Canadian Patent Application No. 3,176,875, mailed Jan. 31, 2024 (5 pages).

VIVO, "Propagation delay compensation for reference time," 3GPP TSG-RAN WG2 Meeting #107bis, R2-1912311, Chongqing, China, Oct. 14-18, 2019 (3 pages).

Nokia et al., "Remaining issues for accurate reference time delivery," 3GPP TSG-RAN WG2 Meeting #107bis, R2-1913451, Chongqing, China, Oct. 14-18, 2019 (5 pages).

Samsung, "Discussion for enhancements for IIoT," 3GPP TSG RAN WG1 #98bis, R1-1910489, Chongqing, China, Oct. 14-20, 2019 (7 pages).

OPPO, "Consideration on propagation delay compensation for TSC," 3GPP TSG-RAN WG2 Meeting #109 electronic, R2-2000705, Feb. 24-Mar. 6, 2020 (4 pages).

VIVO, "RAN2 impacts of 2-step RACH," 3GPP TSG-RAN WG2 Meeting #104, R2-1818260 (Revision of R2-1814263), Spokane, USA, Nov. 12-16, 2018 (5 pages).

Extended European Search Report for European Patent Application No. 20947929.4, mailed Oct. 24, 2023 (16 pages).

Office Action for Canadian Patent Application No. 3,176,875, mailed Oct. 25, 2024 (4 pages).

Office Action and Search Report from Chinese Patent Application No. 202080102782.3 mailed May 7, 2024 with English translation (35 pages).

* cited by examiner

1300

Receive, by a mobile device, from a communication node, time information and an indication whether to perform a propagation delay compensation — 1310

Perform, by the mobile device, the propagation delay compensation on the time information based on a timing advance value — 1320

Transmit, by a mobile device, a first message for indication information associated with a time sensitive networking — 1410

Receive, by a communication node, from a mobile device, capability information associated with a propagation delay compensation — 1510

Transmit, by a first communication node, to a second communication node, time information associated with a propagation delay compensation including at least one of an accurate time information that has been compensated by propagation delay, a timing advance value, or a time offset of a propagation delay — 1610

Transmit, by a communication node, to a mobile device, time information and an indication whether to perform a propagation delay compensation — 1710

Obtain, by a communication node, a timing advance value for a time information compensation — 1810

Select, by the communication node, a first predetermined timing advance value to update the timing advance value upon a determination that a first condition is satisfied, wherein the first predetermined timing advance value is a value configured by the communication node or a value associated with a subcarrier spacing — 1820

┌─────────────────────────────────────────────────────────┐
│ Transmit, by a communication node, information for      │ ─1910
│     configuring a first subcarrier spacing              │
└─────────────────────────────────────────────────────────┘
                              │
┌─────────────────────────────────────────────────────────┐
│  Transmit, by the communication node, information for   │
│ configuring a second subcarrier spacing, wherein the second │ ─1920
│  subcarrier spacing is larger than the first subcarrier spacing │
└─────────────────────────────────────────────────────────┘

Transmit, to a communication node, information for establishing or modifying a protocol data unit session — 2010

Transmit, to a mobile device, a signaling message for indicating a quality of service (QoS) identifier — 2020

FIG. 20

METHODS AND SYSTEMS FOR PROPAGATION DELAY COMPENSATION IN WIRELESS COMMUNICATION NETWORKS

CROSS REFERENCE TO RELATED APPLICATIONS

This patent document is a continuation of and claims benefit of priority to International Patent Application No. PCT/CN2020/107374, filed on Aug. 6, 2020. The entire content of the before-mentioned patent application is incorporated by reference as part of the disclosure of this application.

TECHNICAL FIELD

This patent document relates to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, methods, apparatus, and systems for propagation delay compensation in wireless communications.

In one aspect, a data communication method includes receiving, by a mobile device, reference time information, and performing, upon determination that the mobile device has a capability for a propagation delay compensation, by the mobile device, the propagation delay compensation on the reference time information.

In another aspect, a data communication method includes receiving, by a mobile device, from a communication node, time information and an indication whether to perform a propagation delay compensation, and perform, by the mobile device, the propagation delay compensation on the time information based on a timing advance value.

In another aspect, a data communication method includes transmitting, by a mobile device, a first message for indication information associated with a time sensitive networking.

In another aspect, a data communication method includes receiving, by a communication node, from a mobile device, capability information associated with a propagation delay compensation.

In another aspect, a data communication method includes transmitting, by a first communication node, to a second communication node, time information associated with a propagation delay compensation including at least one of an accurate time information that has been compensated by propagation delay, a timing advance value, or a time offset of a propagation delay.

In another aspect, a data communication method includes transmitting, by a communication node, to a mobile device, time information and an indication whether to perform a propagation delay compensation.

In another aspect, a data communication method includes obtaining, by a communication node, a timing advance value for a time information compensation, and selecting, by the communication node, a first predetermined timing advance value to update the timing advance value upon a determination that a first condition is satisfied, wherein the first predetermined timing advance value is a value configured by the communication node or a value associated with a subcarrier spacing.

In another aspect, a data communication method includes transmitting, by a communication node, information for configuring a first subcarrier spacing, and transmitting, by the communication node, information for configuring a second subcarrier spacing, wherein the second subcarrier spacing is larger than the first subcarrier spacing.

In another aspect, a data communication method includes transmitting, to a communication node, information for establishing or modifying a protocol data unit session, and transmitting, to a mobile device, a signaling message for indicating a quality of service (QoS) identifier.

These, and other, aspects are described in the present document.

BRIEF DESCRIPTION OF THE DRAWINGS

FIG. 13 shows another example of a data communication method based on some example embodiments of the disclosed technology.

FIG. 14 shows another example of a data communication method based on some example embodiments of the disclosed technology.

FIG. 15 shows another example of a data communication method based on some example embodiments of the disclosed technology.

FIG. 16 shows another example of a data communication method based on some example embodiments of the disclosed technology.

FIG. 17 shows another example of a data communication method based on some example embodiments of the disclosed technology.

FIG. 18 shows another example of a data communication method based on some example embodiments of the disclosed technology.

FIG. 19 shows another example of a data communication method based on some example embodiments of the disclosed technology.

FIG. 20 shows another example of a data communication method based on some example embodiments of the disclosed technology.

DETAILED DESCRIPTION

This patent document relates to a propagation delay compensation based on a time advance value, reducing the propagation delay in the transmission process of reference time information.

In some implementations of wireless communications such as LTE (Long Term Evolution), an indicated reference time is referenced at the network without compensating for RF propagation delay. However, in the Industrial Internet of Things (IIoT) and 5G New Radio (NR), a radio layer such as RAN1 performs analysis on the achievable time synchronization accuracy over an interface (e.g., Uu interface) between gNB and UE. Based on RAN1's evaluation, a timing synchronization error between gNB and UE no worse than 540 ns is achievable. For small service areas with dense small cell deployments, the propagation delay compensation might not be needed for larger areas with sparse cell deployments, e.g., for cell radiuses exceeding 200 meters, the propagation delay compensation needs to be applied. For the above problem of propagation delay compensation, RAN1 indicates that half of the time advance can be used in the estimation.

The propagation delay of transmissions from different UEs in a cell can vary as a function of their distance from the base station. OFDM-based 3GPP systems such as LTE and NR are sensitive to time misalignments between transmissions of different UEs due to propagation delays. To maintain orthogonality between different UEs, transmissions need to align within a cyclic prefix duration at the receiver. In order to do so, the UL transmission time of a UE is corrected with the use of timing advance that compensates for the UE's propagation delay. Drifts in the transmission time of a UE is corrected by the gNB which issues a new TA command to advance or retard the UE's transmission time relative to its current uplink transmission time. However, how to use the propagation delay compensation (PDC) in the radio access network (RAN) side needs further research.

Figure 1:
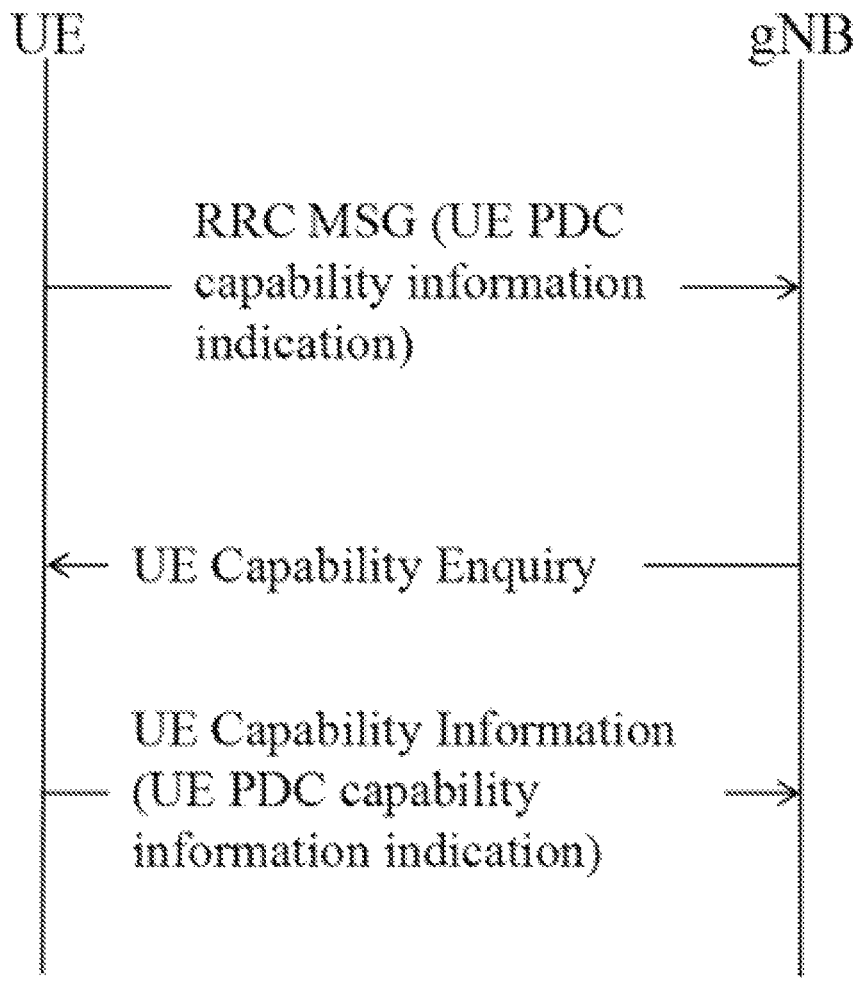
FIG. 1 shows an example method for reporting a propagation delay compensation (PDC) capability.

FIG. 1 shows an example method for reporting propagation delay compensation (PDC) capability.

In some implementations, before determining whether the reference time information is used to perform the PDC, the UE needs to report to the gNB whether the UE can perform the PDC. That is, if the UE does not have the ability to perform the PDC, the gNB is required to perform the PDC. The PDC capability can be reported as discussed below.

PDC Capability Report

As shown in FIG. 1, before determining whether the reference time information is used to perform PDC, UE can indicate its PDC capability information through radio resource control (RRC) MSG3 or UE capability information.

In some implementations, during the random access process initiated by UE, the UE transmits the Msg3 and reports the UE capability information in the MSG3, which includes the information of the UE PDC capability. The information may include at least one of the following: an explicit capability indication in the RRC Msg3; and a bit in the MAC CE accompanying the RRC Msg3 to report the UE PDC capability.

In some implementations, when UE changes capability or mobility triggers the tracking area update (TAU) or attach phase or AMF does not transmit UE capability information, gNB needs to actively query the information as to whether UE supports the PDC capability and such information is included in the report of UE capability information.

Figure 2:
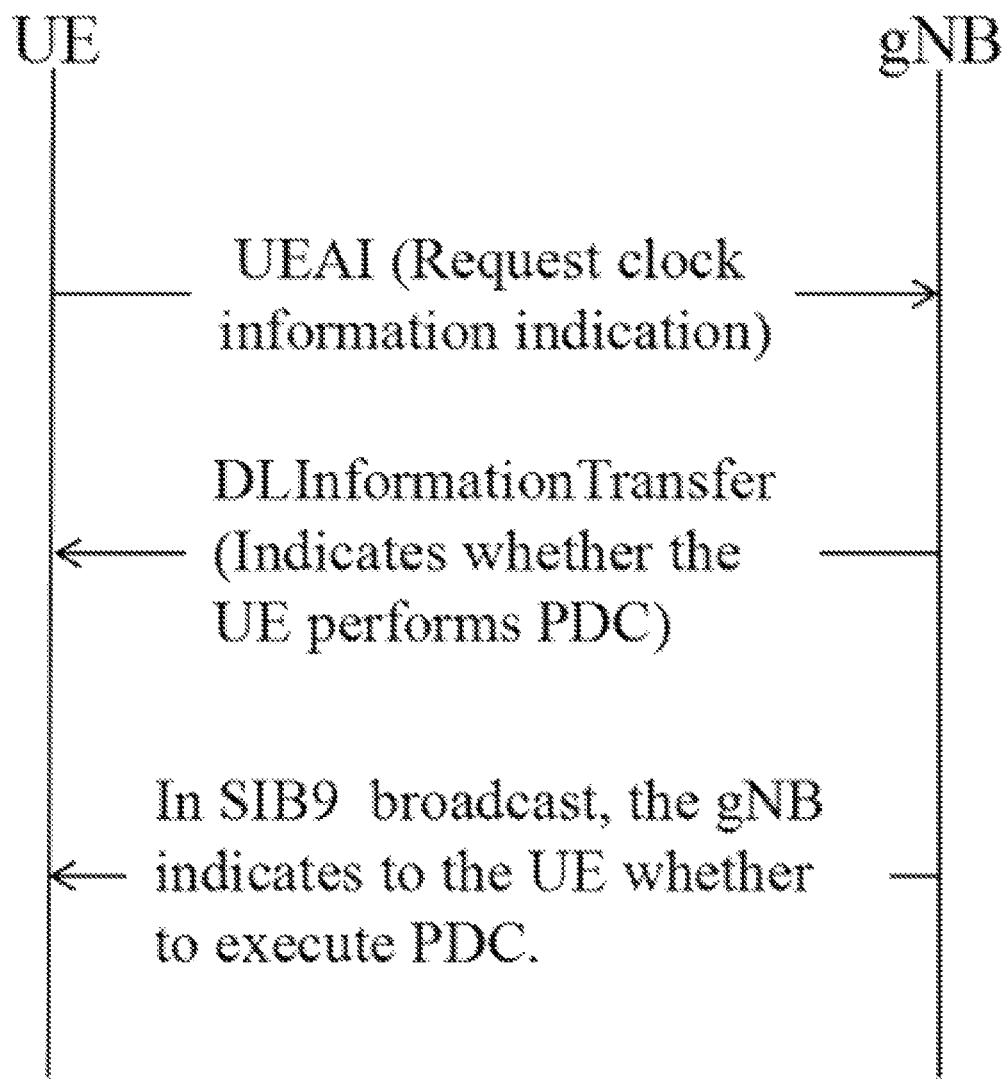
FIG. 2 shows an example method for transmitting an indication of PDC capability.

FIG. 2 shows an example method for transmitting an indication of PDC capability.

In some implementations, when UE has the PDC capability, gNB can determine, based on the distance between the UE and the gNB, whether the UE needs to perform PDC on the reference time information transmitted to the UE. Further, based on the result of the determination, the gNB indicates to the UE whether to perform the PDC. Such an indication can be configured and transmitted as discussed below.

Information Indicating PDC

In some implementations, when UE transmits, to the gNB, UE assistance information (UEAI) containing request time information, the gNB transmits reference time information to the UE through unicast or broadcast and indicates to the UE whether to perform the PDC. Example methods include the following.

In some implementations, when transmitting time information via a unicast channel, the gNB sends to the UE a message indicating whether to perform the PDC. If the message indicates that the UE does not perform the PDC, the gNB uses an actual measurement value to compensate for the time information. Otherwise, the UE uses the current valid timing advance (TA) value to compensate for the time information. Examples of indication mode for PDC can include the followings: indication information as to whether the UE performs the PDC is included in DLInformationTransfer; and the indication information as to whether the UE performs the PDC is included in ReferenceTimeInfo.

In some implementations, when the gNB broadcasts the time information, the gNB indicates the UE whether to perform the PDC through system information block (SIB) information or a medium access control (MAC) control element (MAC CE) or downlink control information (DCI). Examples of indication methods include the followings: the SIB information contains the PDC indication; the UE decides whether to perform PDC according to a reference signal received power (RSRP) threshold contained in the SIB information; a logical channel ID (LCID) reserved in a downlink shared channel (DLSCH) contains the predefined MAC CE format of the above indication information; the predefined DCI format carries indication information as to whether to perform the PDC indication; and the ReferenceTimeInfo IE contains the indication information as to whether the UE performs the PDC indication.

Figure 3:
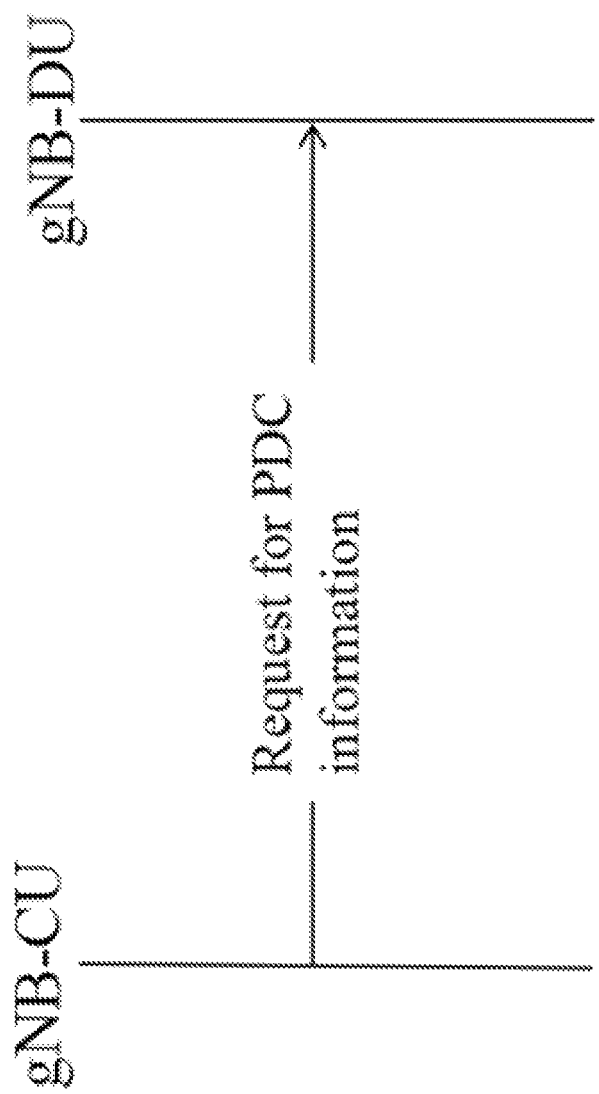
FIG. 3 shows an example method transmitting a request for PDC from gNB-CU (central unit) to gNB-DU (distribution unit).

FIG. 3 shows an example method transmitting a request for PDC from gNB-CU (central unit) to gNB-DU (distribution unit).

In some implementations, gNB is divided into a concentration unit (gNB-CU) and a distribution unit (gNB-DU). In performing PDC, the gNB-CU is used to request the gNB-DU to send accurate time information with PDC or a valid TA value or a time offset of the propagation delay. Examples of such procedures between gNB-CU and gNB-DU include the followings.

Request for PDC from gNB-CU to gNB-DU

As shown in FIG. 3, gNB includes gNB-CU and gNB-DU. When UE needs to perform PDC, gNB-CU requests that gNB-DU provide accurate time information with respect to PDC. For example, gNB-CU requests information associated with PDC, or a valid TA value, or the time offset of the propagation delay.

In some implementations, the request may include at least one of the following: REFERENCE TIME INFORMATION REPORTING CONTROL, RESET, ERROR INDICATION, GNB-CU CONFIGURATION UPDATE, GNB-DU RESOURCE COORDINATION REQUEST, PAGING, SYSTEM INFORMATION DELIVERY COMMAND.

Figure 4:
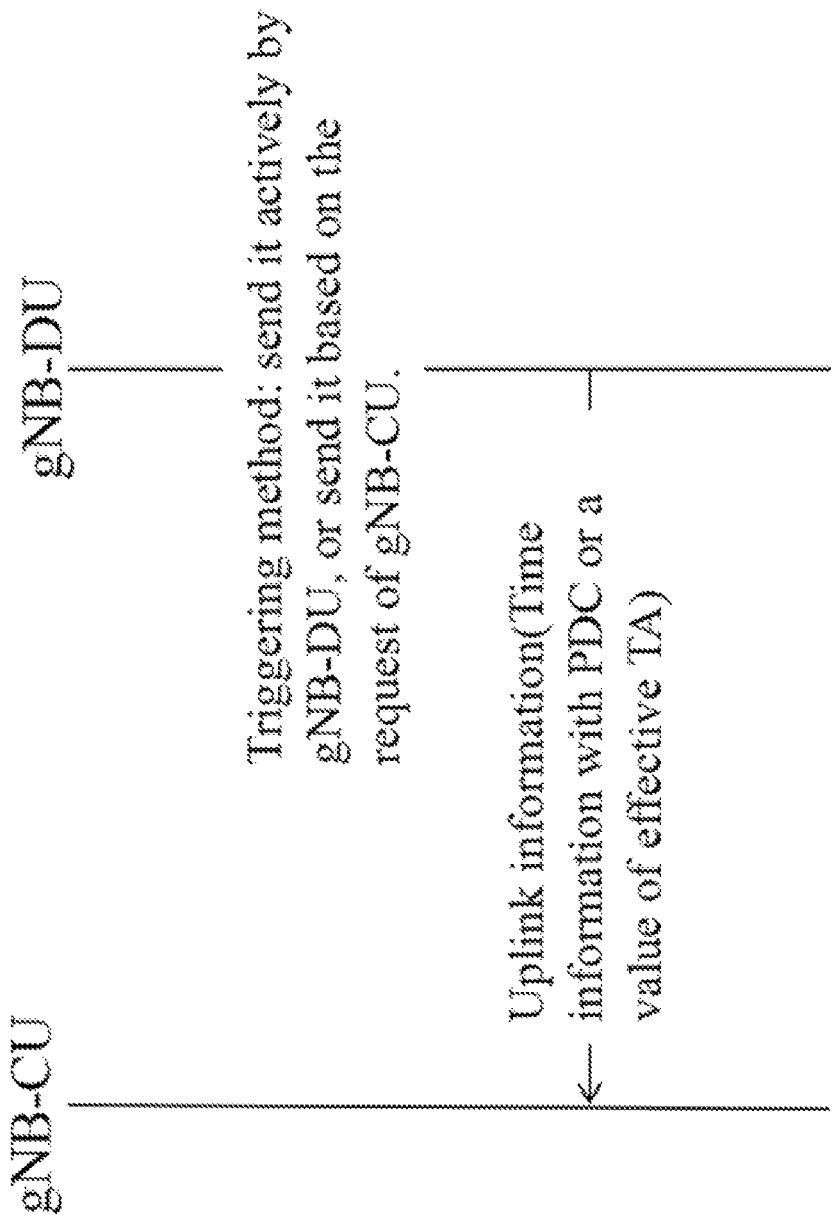
FIG. 4 shows an example method for transmitting information of PDC from gNB-DU to gNB-CU.

FIG. 4 shows an example method for transmitting information of PDC from gNB-DU to gNB-CU.

In the case where the gNB is divided into the gNB-CU and the gNB-DU, the accurate time information associated with PDC carried by a radio resource control (RRC) message is derived from the accurate time information associated with PDC transmitted by the gNB-DU, or a valid TA value transmitted by the gNB-DU, or the time offset of the propagation delay of the gNB-DU transmission. Information associated with PDC can be transmitted from gNB-DU to gNB-CU as follows.

Transmission of Information Associated with PDC from gNB-DU to gNB-CU

As shown in FIG. 4, the triggering conditions for sending information associated with PDC from the gNB-DU to the gNB-CU are provided by the gNB-DU actively or are determined based on the gNB-CU request, wherein the condition provided by gNB-DU actively is that the timing advance value in the first communication node is updated.

In some implementations, gNB-DU transmits an accurate time information that has been compensated by propagation delay or a valid TA value or the time offset of the propagation delay to gNB-CU through uplink information. In the case of sending a valid TA value, the gNB-CU uses the TA value to compensate for the propagation delay according to the time information synchronized with the gNB-DU.

In some implementations, the uplink information contains at least one of the following: REFERENCE TIME INFORMATION REPORT, GNB-DU CONFIGURATION UPDATE, GNB-DU STATUS INDICATION, UE CONTEXT SETUP REQUEST, UE CONTEXT RELEASE REQUEST, UE CONTEXT MODIFICATION REQUIRED, UE INACTIVITY NOTIFICATION, NOTIFY, INITIAL UL RRC MESSAGE TRANSFER, UL RRC MESSAGE TRANSFER, RRC CONTAINER DELIVERY REPORT.

Figure 5:
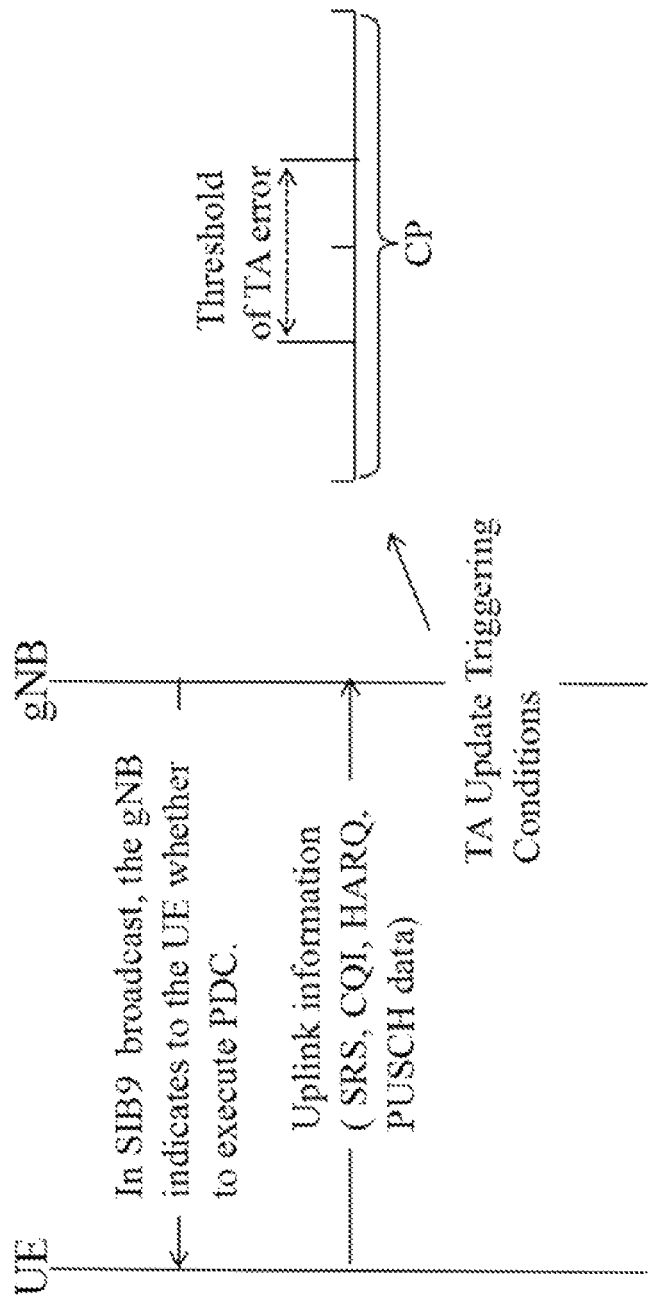
FIG. 5 shows an example method for performing PDC from UE based on timing advance (TA) update information.

FIG. 5 shows an example method for performing PDC from UE based on timing advance (TA) update information.

In the case of transmitting time information by broadcast, gNB measures the uplink signal of UE. According to the corresponding TA value calculated by the measurement results and trigger conditions, the gNB is triggered to send the updated value of the TA to the UE. UE can perform PDC based on TA update as follows.

PDC by UE Based on TA Update

As shown in FIG. 5, in the case of transmitting time information by broadcast, gNB indicates UE whether to perform PDC through SIB information, MAC CE or DCI. If the UE is indicated to perform the PDC, the UE uses the current valid TA for time information compensation. The gNB measures the time of UE uplink signal (e.g., SRS, CQI, HARQ and PUSCH data) to obtain the current valid TA value based on the measurement results. The gNB selects the first predetermined value to update timing advance if a condition is satisfied. Otherwise, gNB selects the second predetermined value to update timing advance, wherein the second predetermined value is larger than the first predetermined value. The first predetermined value is a value configured by the gNB or a value associated with a subcarrier spacing. The condition contains the mobile device needs to perform PDC.

The triggering conditions for determining whether TA value is updated includes one of the following: the uplink data sent by UE falls outside the range of cyclic prefix(CP); the update is triggered before the timer TimeAlignmentTimer is about to expire; when the error between the previous TA value and the current measured TA value is greater than 1 or 2 ˆu, the TA update is triggered, where u is related to a sub carrier spacing (SCS); in the case where UE triggers the time request or gNB sends the time information, if UE needs to perform PDC, the TA update is triggered; and before the UE performs the PDC and the reference time information is updated, the TA does not update based on the error of the TA value mentioned above.

Figure 6:
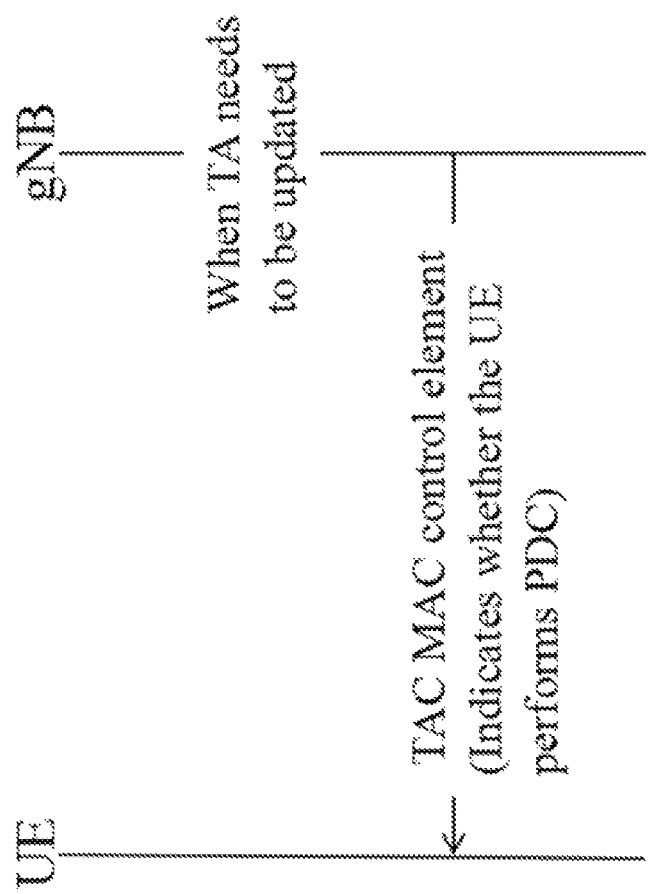
FIG. 6 shows an example method for transmitting the TA update information from gNB to UE through a timing advance command medium access control (TAC MAC) control element when TA needs to be updated.

FIG. 6 shows an example method for transmitting the TA update information from gNB to UE through a timing advance command medium access control (TAC MAC) control element when TA needs to be updated.

Based on the triggering conditions of TA update, gNB sends TA update information to UE through a timing advance command when TA needs to be updated. The message contains the indication whether the UE needs to perform PDC.

As shown in FIG. 6, when TA needs to be updated, gNB sends TA update information (Timing Advance Command) to UE through a timing advance command medium access control (TAC MAC) control element. Furthermore, the gNB indicates to UE whether PDC is needed. The indication method includes using the reserved value of LCID for DL-SCH in MAC subheader indication to represent the new Timing Advance Command MAC CE. UE receives TAC represented by a reserved value LCID, it indicates that UE does not need to perform PDC. Otherwise, UE determines that it is necessary to perform PDC.

Figure 7:
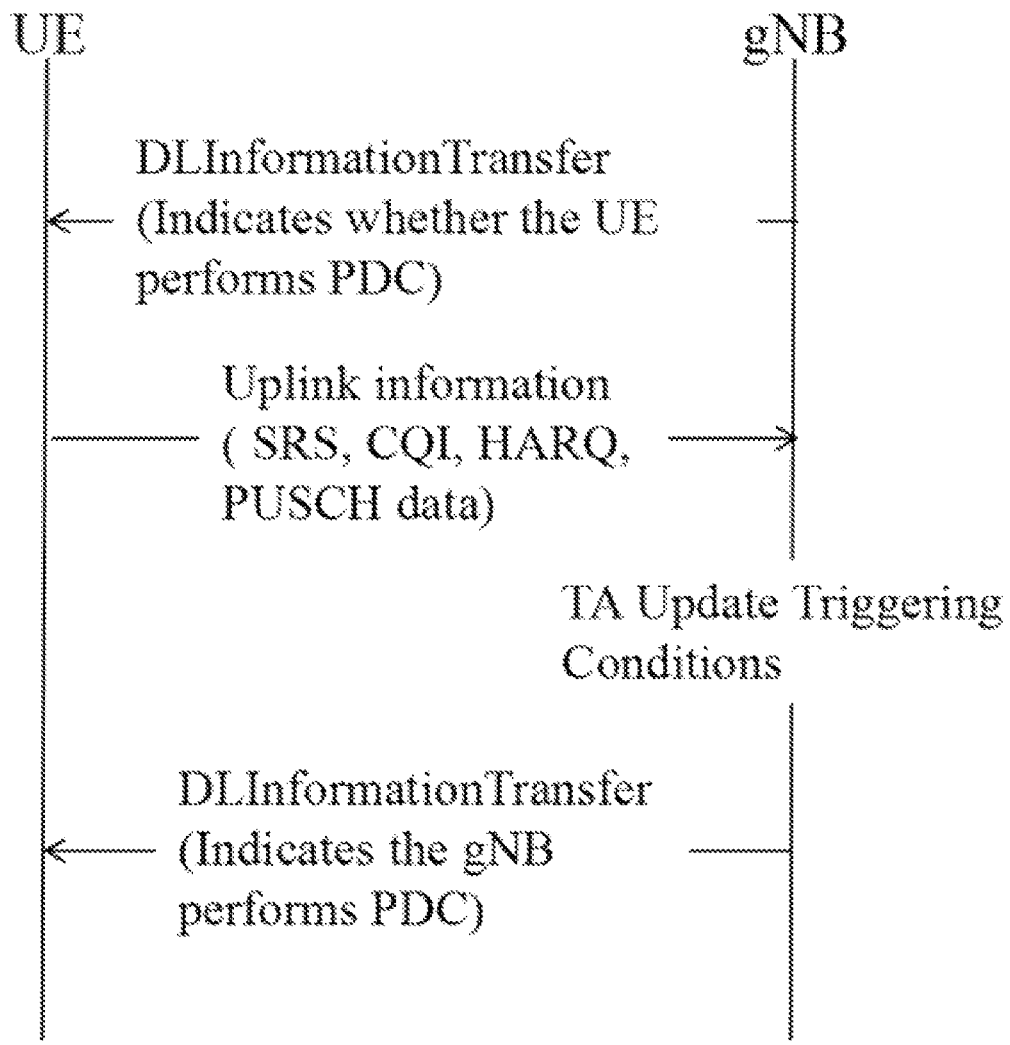
FIG. 7 shows an example method for performing PDC by gNB to update a reference time.

FIG. 7 shows an example method for performing PDC by gNB to update a reference time.

When a unicast is used to transmit time information, gNB measures the uplink signal of UE. According to the corresponding TA value calculated by the measurement result and triggering conditions, the gNB sends accurate time information associated with PDC to UE.

PDC by gNB to Update a Reference Time

As shown in FIG. 7, in the case of unicast transmission of time information, gNB sends information containing the indication not to perform the PDC to the UE through the DLInformationTransfer. In some implementations, gNB compensates time information with actual measured value. The gNB measures the time of UE uplink signal (e.g., SRS, CQI, HARQ and PUSCH data) to obtain the current valid TA value based on the measurement results. The gNB selects the first predetermined value to update timing advance if a condition is satisfied. Otherwise, gNB selects the second predetermined value to update timing advance, wherein the second predetermined value is larger than the first predetermined value. The first predetermined value is a value configured by the gNB or a value associated with a subcarrier spacing. The condition contains at least that the mobile device needs to perform PDC or the gNB needs to perform PDC.

The triggering conditions for determining whether TA is updated includes one of the following: the uplink data sent by UE falls outside the range of CP; the update is triggered before the timer timeAlignmentTimer is about to expire; when the error between the previous TA value and the current measured TA value is greater than 1 or 2 ˆu, the TA update is triggered, where u is related to the SCS; in the case where UE triggers the time request or gNB sends the time information, if UE needs to perform PDC, the TA update is triggered; before the gNB performs the PDC and the reference time information is updated, the TA does not update based on the error of the TA value mentioned above.

When the TA needs to be updated, the gNB sends an accurate time information that has been performed with PDC to the UE through the DLInformationTransfer and indicates the UE not to perform the PDC.

Figure 8:
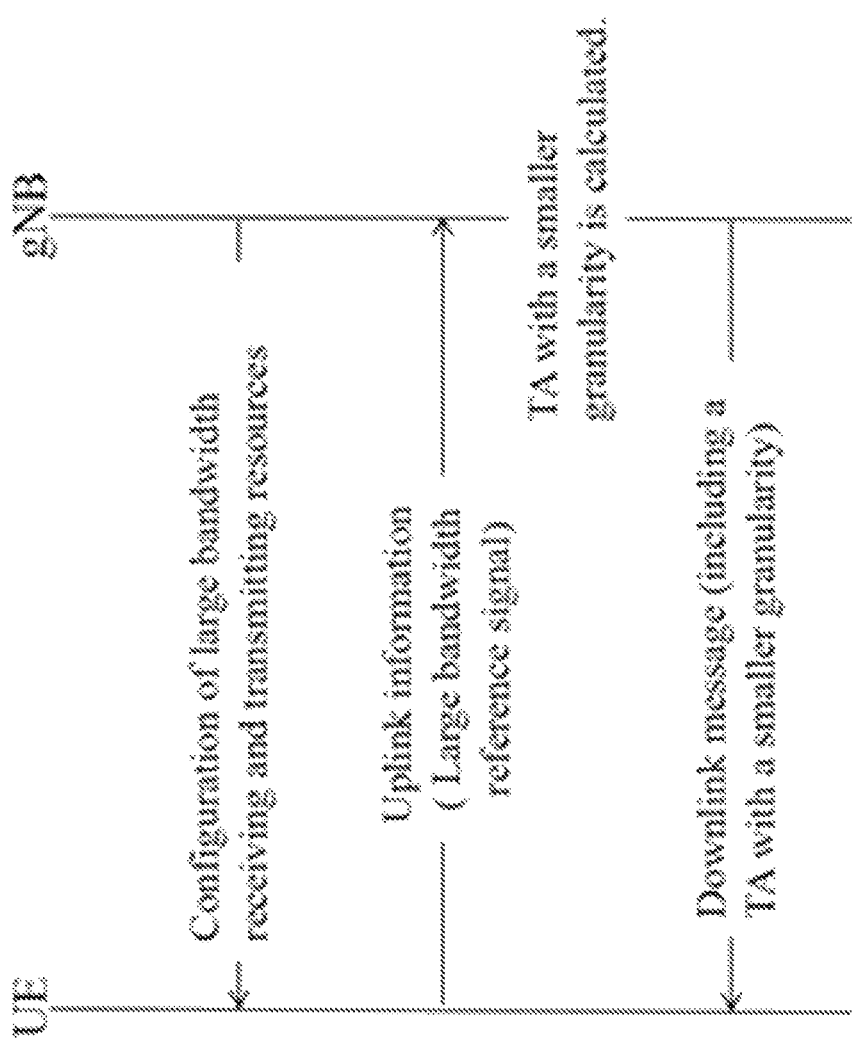
FIG. 8 shows an example method for performing PDC using TA granularity obtained by using a relatively large subcarrier spacing.

FIG. 8 shows an example method for performing PDC using TA granularity obtained by using a relatively large subcarrier spacing.

When the UE uses a first subcarrier spacing (e.g., 15 kHz, 30 kHz, or 60 kHz) to carry service information, gNB measures the uplink signal of UE at a second subcarrier spacing (e.g., 120 kHz or 240 khz) based on an indication information. The indication information includes at least one of synchronization accuracy information of uplink air interface, high synchronization accuracy request, configured grant (CG) resource request dedicated to mobile device, physical random access channel (PRACH) resource request dedicated to mobile device, synchronization accuracy information of downlink air interface, high synchronization accuracy request, synchronization signal block (SSB) resource dedicated to the mobile device, a semi-persistent scheduling (SPS) resource dedicated to the mobile device, service type, synchronization accuracy information of air interface, synchronization accuracy request, Synchronization QoS parameter request, TSN resource request for mobile device, and request for configuring subcarrier spacing. The TA with a smaller granularity is calculated based on the measurement. The first subcarrier spacing are configured by a master information block (MIB) message or a system information block (SIB) message, wherein the configuration include SSB configuration, coreset zero configuration or PRACH configuration. The resources of the first subcarrier spacing are configured by a radio resource control message or a medium access control (MAC) control element.

As shown in FIG. 8, when the UE needs to perform PDC and uses the 15 kHz, 30 kHz or 60 kHz subcarrier spacing to carry service information, the TA granularity obtained by using the subcarrier spacing is relatively large. Therefore, in order to improve the clock synchronization accuracy, gNB configures the UE with a large bandwidth for receiving and transmitting resources by a radio resource control message.

In the uplink, the UE is configured with a large bandwidth (SCS) CG resources dedicated to UE, large-bandwidth PRACH (Physical Random Access Channel) resources dedicated to UE, and uplink clock synchronization signals dedicated to UE.

In the downlink, the UE is configured with large bandwidth (SCS) SSB resources dedicated to UE, SPS resources with a large bandwidth dedicated to UE, and downlink clock synchronization signal, sound signal and reference signal for UE with a large bandwidth.

Based on the measurement of large bandwidth reference signal, the propagation delay time is calculated, and the TA with smaller granularity is obtained.

After obtaining the propagation delay time, gNB maintains time information associated with PDC and indicates UE not to perform PDC information through downlink information. The downlink information includes at least one of the following: the LCD reserved in DLSCH indicates the predefined MAC CE format containing PDC time information, for example, PDC time includes at least one of the offset of reference time or TA with smaller granularity; MAC RAR with information of smaller TA is indicated by LCID reserved in DLSCH; and DLInformationTransfer message contains the reference time information that has performed the PDC.

Figure 9:
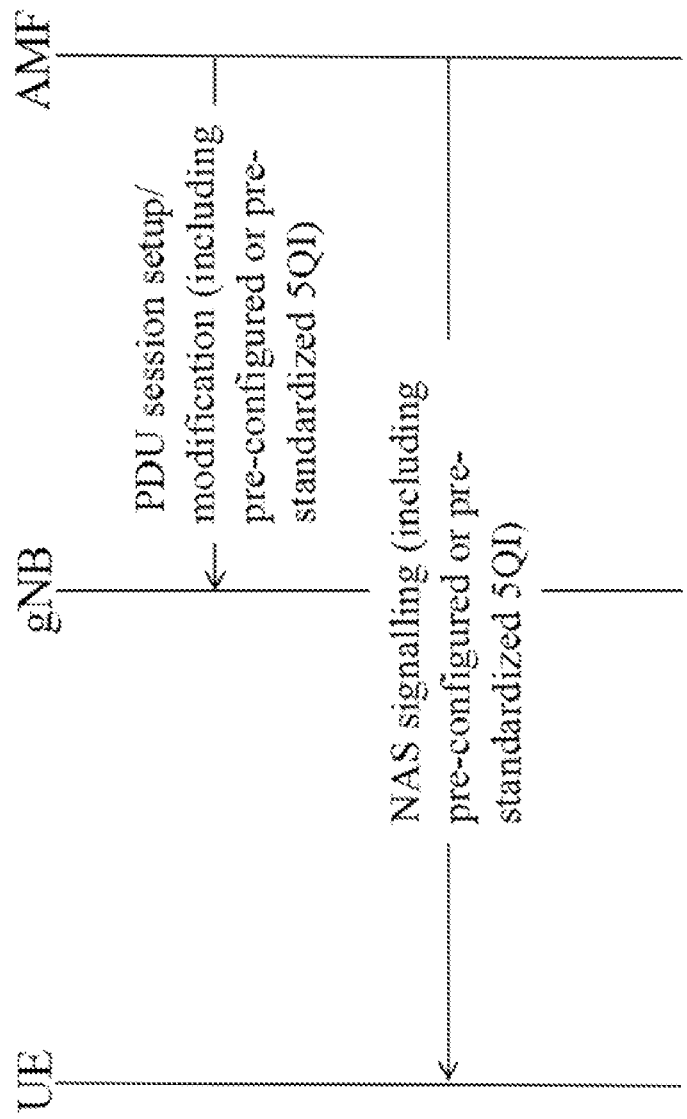
FIG. 9 shows an example method for using QoS flow to improve the transmission efficiency.

FIG. 9 shows an example method for using QoS flow to improve the transmission efficiency.

In order to meet the requirements associated with a packet residence time in some services, pre-configured or pre-standardized QoS flow characteristics are used to reduce the packet residence time and improve the transmission efficiency in a PDU session setup or modification.

As shown in FIG. 9, in order to meet the requirements for the residence time limit of data packets in the bridge, QoS flow with high performance is configured for the service to improve the transmission efficiency. When establishing or modifying a PDU session, the AMF notifies the gNB and the UE of the pre-configured or pre-standard 5QI value through the downlink information. The pre-configured is to configure a high-performance QoS flow and configure a pre-defined 5QI value in AN. The pre-standardized 5QI value refers to the pre-defined index value of 5G QoS characteristic, that is, this QoS characteristic has high performance. This high-performance QoS flow has at least one of the following characteristics: it has a high priority level, can preempt the resources of a low priority traffic flow, can be preempted by high priority traffic flow, low packet delay budget, low packet error rate, high GFBR, and high MFBR.

Figure 10:
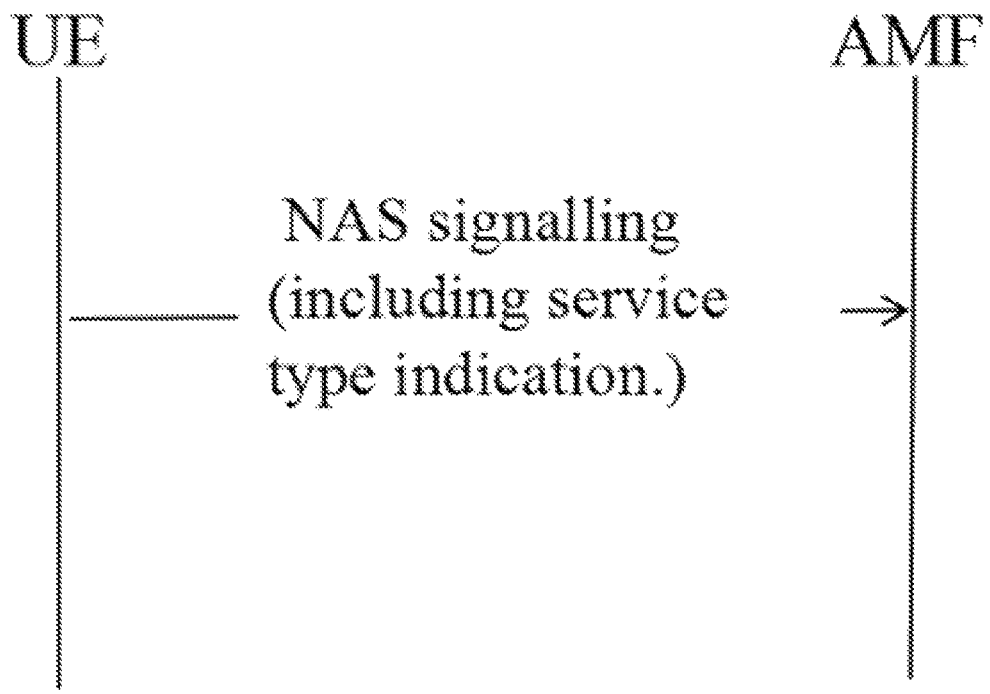
FIG. 10 shows an example method for notifying an access and mobility management function (AMF) of an indicate as to a current service type through an NAS message.
Figure 11:
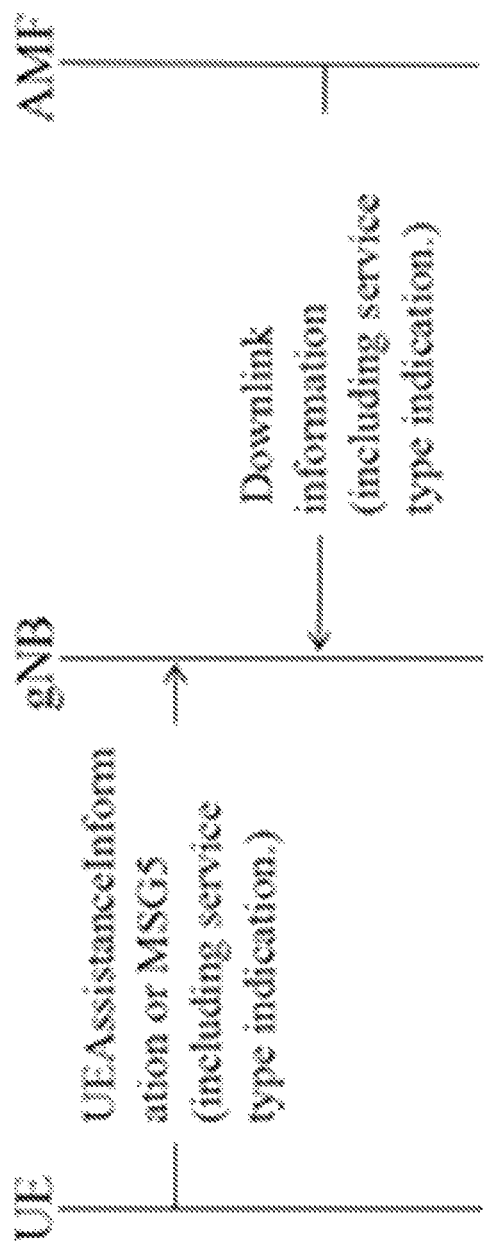
FIG. 11 shows an example method for notifying gNB of an indication as to the current service type through UE assistance information or radio resource control message.

FIG. 10 shows an example method for notifying an access and mobility management function (AMF) of indication information through an NAS message.

In a time-sensitive communication (TSC) between UE-UE of the same user plane function (UPF), the core network needs to obtain the current service type during uplink transmission.

In order to identify the service of TSC communication between UE-UE of the same UPF, at least one of the following methods can be used.

In some implementations, UE notifies AMF of the information containing indication information through an NAS message. Here, the indication information includes at least one of service type, synchronization accuracy information of air interface, synchronization accuracy request, QoS parameter request, resource request for mobile device, and request for configuring subcarrier spacing. The NAS message includes at least one of the following: service request message, ULInformationTransfer message, or registration request message. Furthermore, AMF notifies gNB of the information containing the indication of the current service type through the uplink message. The downlink message includes at least one of the following: PDU SESSION RESOURCE SETUP REQUEST message, PDU SESSION RESOURCE RELEASE COMMAND message, PDU SESSION RESOURCE MODIFY REQUEST message, INI- TIAL CONTEXT SETUP RESPONSE message, UE CONTEXT RELEASE COMMAND message, UE CONTEXT MODIFICATION REQUEST message, HANDOVER REQUEST message.

In some implementations, UE notifies gNB of the information containing the indication information through radio link control (RLC) status packet, medium access control (MAC) control element (MAC CE), MAC preamble, packet data convergence protocol (PDCP) status packet, UEAssistanceInformation or radio resource control (RRC) message. In the case of carrying the indication information by RLC status package or PDCP status package, indication information in RLC status package or PDCP status package needs to be predefined. In the case of carrying the indication information by MAC CE, the MAC CE format with indication information needs to be predefined. In the case of carrying the indication information by MAC preamble, the gNB needs to broadcast the preamble resource for indication information. In the case of carrying the indication information by the RRC message, the RRC message includes at least one of the following: RRCSystemInfoRequest, RRCSetupRequest, RRCResumeRequest, RRCResumeRequest1, RRCReestablishmentRequest, RRRCReestablishmentComplete message, RRCReconfigurationComplete message, RRCResumeComplete message, RRCSetupComplete message.

In some implementations, before determining whether the reference time information performs the PDC, the UE needs to report to the gNB whether the UE can perform the PDC.

In some implementations, based on the distance between UE and gNB, gNB sends the indication of PDC to UE through DLInformationTransfer and SIB information.

In some implementations, in the case of gNB-DU sending actively or based on gNB-CU request, gNB-DU sends information of PDC to gNB-CU.

In some implementations, based on the triggering conditions for TA update, the method for the UE or gNB to perform PDC is proposed.

In some implementations, in the case of a small subcarrier spacing, the measurement accuracy of TA and the compensation accuracy of reference time are improved by configuring a large subcarrier spacing through gNB.

In some implementations, in PDU session setup and/or modification, the pre-configured or pre-standardized high-performance QoS flow characteristic reduces the residence time of packets and improves the transmission efficiency.

In some implementations, in order to identify the TSC communication service between UE-UE of the same UPF, UE forwards the service type to AMF through NAS message.

Figure 12:
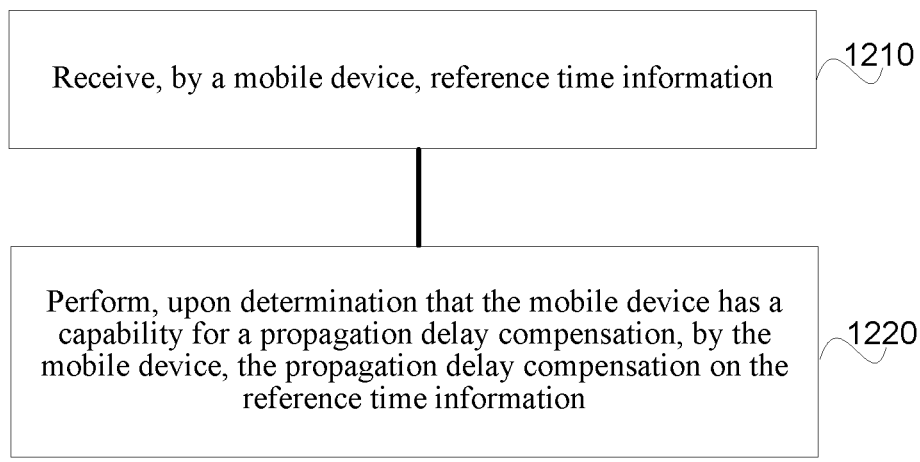
FIG. 12 shows an example of a data communication method based on some example embodiments of the disclosed technology.

FIG. 12 shows an example of a data communication method based on some example embodiments of the disclosed technology.

In some embodiments of the disclosed technology, a data communication method 1200 includes, at 1210, receiving, by a mobile device, reference time information, and at 1220, performing, upon determination that the mobile device has a capability for a propagation delay compensation, by the mobile device, the propagation delay compensation on the reference time information.

FIG. 13 shows another example of a data communication method based on some example embodiments of the disclosed technology.

In some embodiments of the disclosed technology, a data communication method 1300 includes, at 1310, receiving, by a mobile device, from a communication node, time information and an indication whether to perform a propagation delay compensation, and at 1320, performing, by the mobile device, the propagation delay compensation on the time information based on a timing advance value.

FIG. 14 shows another example of a data communication method based on some example embodiments of the disclosed technology.

In some embodiments of the disclosed technology, a data communication method 1400 includes, at 1410, transmitting, by a mobile device, a first message for indication information associated with a time sensitive networking.

FIG. 15 shows another example of a data communication method based on some example embodiments of the disclosed technology.

In some embodiments of the disclosed technology, a data communication method 1500 includes, at 1510, receiving, by a communication node, from a mobile device, capability information associated with a propagation delay compensation.

FIG. 16 shows another example of a data communication method based on some example embodiments of the disclosed technology.

In some embodiments of the disclosed technology, a data communication method 1600 includes, at 1610, transmitting, by a first communication node, to a second communication node, time information associated with a propagation delay compensation including at least one of an accurate time information that has been compensated by propagation delay, a timing advance value, or a time offset of a propagation delay.

FIG. 17 shows another example of a data communication method based on some example embodiments of the disclosed technology.

In some embodiments of the disclosed technology, a data communication method 1700 includes, at 1710, transmitting, by a communication node, to a mobile device, time information and an indication whether to perform a propagation delay compensation.

FIG. 18 shows another example of a data communication method based on some example embodiments of the disclosed technology.

In some embodiments of the disclosed technology, a data communication method 1800 includes, at 1810, obtaining, by a communication node, a timing advance value for a time information compensation, at 1820, and selecting, by the communication node, a first predetermined timing advance value to update the timing advance value upon a determination that a first condition is satisfied, wherein the first predetermined timing advance value is a value configured by the communication node or a value associated with a subcarrier spacing.

FIG. 19 shows another example of a data communication method based on some example embodiments of the disclosed technology.

In some embodiments of the disclosed technology, a data communication method 1900 includes, at 1910, transmitting, by a communication node, information for configuring a first subcarrier spacing, and at 1920, transmitting, by the communication node, information for configuring a second subcarrier spacing, wherein the second subcarrier spacing is larger than the first subcarrier spacing.

FIG. 20 shows another example of a data communication method based on some example embodiments of the disclosed technology.

In some embodiments of the disclosed technology, a data communication method 2000 includes, at 2010, transmitting, to a communication node, information for establishing or modifying a protocol data unit session, and at 2020, transmitting, to a mobile device, a signaling message for indicating a quality of service (QoS) identifier.

Figure 21:
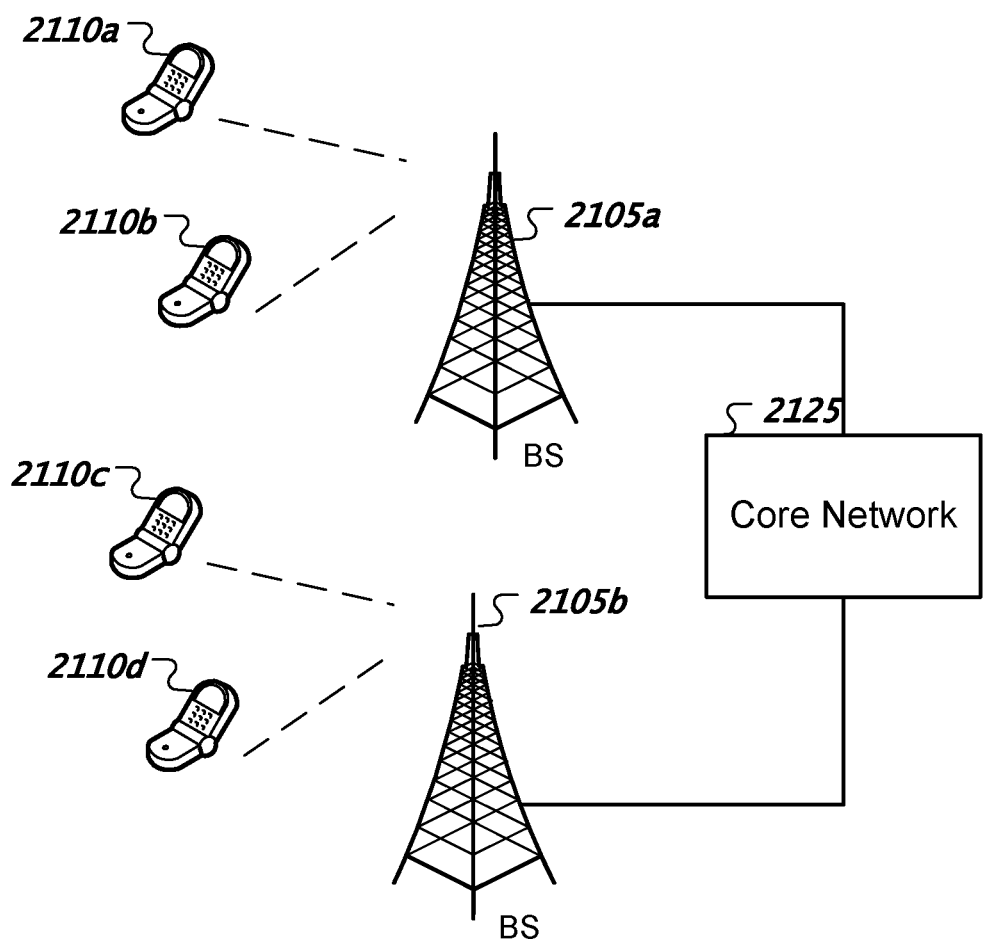
FIG. 21 shows an example of a wireless communication system where techniques in accordance with one or more embodiments of the present technology can be applied.

FIG. 21 shows an example of a wireless communication system 2100 where techniques in accordance with one or more embodiments of the present technology can be applied. A wireless communication system 2100 can include one or more base stations (BSs) 2105a, 2105b, one or more wireless devices 2110a, 2110b, 2110c, 2110d, and a core network 2125. A base station 2105a, 2105b can provide wireless service to wireless devices 2110a, 2110b, 2110c and 2110d in one or more wireless sectors. In some implementations, a base station 2105a, 2105b includes directional antennas to produce two or more directional beams to provide wireless coverage in different sectors.

The core network 2125 can communicate with one or more base stations 2005a, 2105b. The core network 2125 provides connectivity with other wireless communication systems and wired communication systems. The core network may include one or more service subscription databases to store information related to the subscribed wireless devices 2110a, 2110b, 2110c, and 2110d. A first base station 2105a can provide wireless service based on a first radio access technology, whereas a second base station 2105b can provide wireless service based on a second radio access technology. The base stations 2105a and 2105b may be co-located or may be separately installed in the field according to the deployment scenario. The wireless devices 2110a, 2110b, 2110c, and 2110d can support multiple different radio access technologies. The techniques and embodiments described in the present document may be implemented by the base stations of wireless devices described in the present document.

Figure 22:
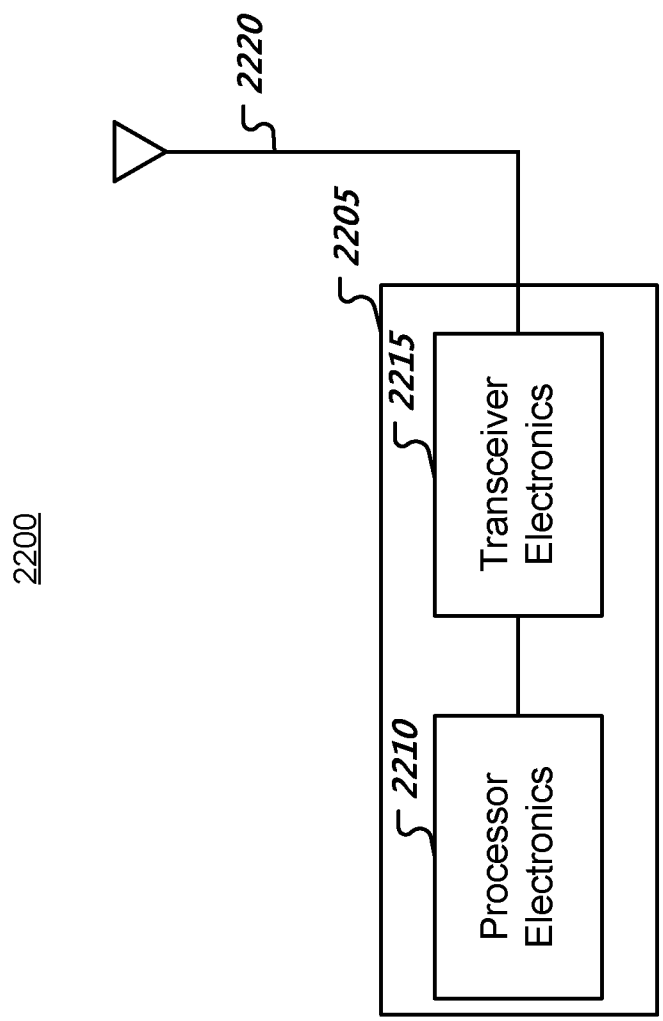
FIG. 22 is a block diagram representation of a portion of a radio station in accordance with one or more embodiments of the present technology can be applied.

FIG. 22 is a block diagram representation of a portion of a radio station in accordance with one or more embodiments of the present technology can be applied. A radio 2205 such as a base station or a wireless device (or UE) can include processor electronics 2210 such as a microprocessor that implements one or more of the wireless techniques presented in this document. The radio 2205 can include transceiver electronics 2215 to send and/or receive wireless signals over one or more communication interfaces such as antenna 2220. The radio 2205 can include other communication interfaces for transmitting and receiving data. Radio 2205 can include one or more memories (not explicitly shown) configured to store information such as data and/or instructions. In some implementations, the processor electronics 2210 can include at least a portion of the transceiver electronics 2215. In some embodiments, at least some of the disclosed techniques, modules or functions are implemented using the radio 2205. In some embodiments, the radio 2205 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: receiving, by a mobile device, reference time information; and performing, upon determination that the mobile device has a capability for a propagation delay compensation, by the mobile device, the propagation delay compensation on the reference time information.

Clause 2. The method of clause 1, further comprising transmitting, by the mobile device, to a communication node, a report message to indicate that the mobile device has a capability for a propagation delay compensation.

Clause 3. The method of clause 2, wherein the report message is transmitted through at least one of a radio resource control message (e.g., RRC MSG3), a medium access control (MAC) control element (e.g., MAC CE) or user equipment capability information.

Clause 4. A data communication method, comprising: receiving, by a mobile device, from a communication node, time information and an indication whether to perform a propagation delay compensation; and performing, by the mobile device, the propagation delay compensation on the time information based on a timing advance value (e.g., TA).

Clause 5. The method of clause 4, wherein the time information is transmitted through a unicast channel, and the indication is transmitted through at least one of a downlink information transfer message (e.g., DLInformationTransfer) or a reference time information message (e.g., ReferenceTimeInfo).

Clause 6. The method of clause 4, wherein the indication is transmitted to the mobile device by at least one of indication means, including: system information block (e.g., SIB); a threshold value of a reference signal received power through the system information block information; a logical channel identifier (e.g., LCID) reserved in a downlink shared channel including a predefined medium access control (MAC) control element, a predefined format of downlink control information, and a reference time information.

Clause 7. A data communication method, comprising: transmitting, by a mobile device, a first message for indication information associated with a time sensitive networking.

Clause 8. The method of clause 7, wherein the first message is a non-access stratum signaling message including at least one of service request message, uplink information transfer message or registration request message.

Clause 9. The method of clause 7, wherein the first message is transmitted through a user equipment assistance information message or a radio resource control message.

Clause 10. The method of clauses 7, wherein the mobile device receives configuration information for at least one of an uplink data transmission or a downlink data transmission transmitted by a communication node.

Clause 11. The method of any of clauses 7-10, wherein the indication information includes at least one of synchronization accuracy information of uplink air interface, high synchronization accuracy request, configured grant (CG) resource request dedicated to mobile device, and physical random access channel (PRACH) resource request dedicated to the mobile device.

Clause 12. The method of any of clauses 7-10, wherein the indication information in a downlink transmission includes at least one of synchronization accuracy information of downlink air interface, high synchronization accuracy request, synchronization signal block (SSB) resource dedicated to the mobile device, a semi-persistent scheduling (SPS) resource dedicated to the mobile device.

Clause 13. The method of any of clauses 7-12, wherein the indication information in a data transmission includes at least one of service type, synchronization accuracy information of air interface, synchronization accuracy request, synchronization QoS parameter request, time sensitive networking (TSN) resource request for mobile device, and request for configuring a subcarrier spacing.

Clause 14. A data communication method, comprising: receiving, by a communication node, from a mobile device, capability information associated with a propagation delay compensation.

Clause 15. The method of clause 14, wherein the capability information includes an indication as to whether the mobile device is configured to perform a propagate delay compensation.

Clause 16. A data communication method, comprising: transmitting, by a first communication node (e.g., gNB-DU), to a second communication node (e.g., gNB-CU), time information associated with a propagation delay compensation including at least one of an accurate time information that has been compensated by propagation delay, a timing advance value, or a time offset of a propagation delay.

Clause 17. The method of clause 16, further comprising receiving, by the first communication node, from the second communication node, a request for the time information associated with the propagation delay compensation.

Clause 18. The method of clause 16, further comprising triggering, by the first communication node, a condition for the propagation delay compensation to transmit the time information associated with the propagation delay compensation.

Clause 19. The method of clause 18, wherein the condition is that the timing advance value in the first communication node is updated.

Clause 20. A data communication method, comprising: transmitting, by a communication node, to a mobile device, time information and an indication whether to perform a propagation delay compensation.

Clause 21. The method of clause 20, wherein the indication is transmitted to the mobile device by at least one of indication means, including: system information block; a threshold value of a reference signal received power through the system information block information; a logical channel identifier (e.g., LCID) reserved in a downlink shared channel including a predefined medium access control (MAC) control element, a predefined format of downlink control information, and a reference time information.

Clause 22. A data communication method, comprising: obtaining, by a communication node, a timing advance value for a time information compensation; and selecting, by the communication node, a first predetermined timing advance value to update the timing advance value upon a determination that a first condition is satisfied, wherein the first predetermined timing advance value is a value configured by the communication node or a value associated with a subcarrier spacing Clause 23. The method of clause 22, further comprising selecting, by the communication node, a second predetermined timing advance value to update the timing advance value upon a determination that the first condition is not satisfied, wherein the second predetermined timing advance value is larger than the first predetermined timing advance value.

Clause 24. The method of clause 22, wherein the first condition is satisfied upon determination that the mobile device is configured to perform a propagation delay compensation, or that the communication node is configured to perform the propagation delay compensation.

Clause 25. The method of clause 22, wherein the timing advance value is not updated before the mobile device or the communication node performs the propagation delay compensation and time information is updated.

Clause 26. The method of clause 22, wherein the timing advance value is determined to be updated upon performing the propagation delay compensation by the mobile device.

Clause 27. A data communication method, comprising: transmitting, by a communication node, information for configuring a first subcarrier spacing, and transmitting, by the communication node, information for configuring a second subcarrier spacing, wherein the second subcarrier spacing is larger than the first subcarrier spacing.

Clause 28. The method of clause 27, wherein the communication node receives an indication information associated with the subcarrier spacing from the mobile device or the core network before configuring the second subcarrier spacing.

Clause 29. The method of clause 27, wherein the configuration information of the second subcarrier spacing of the uplink transmission includes at least one of a configured grant (CG) resource dedicated to the mobile device, a physical random access channel (PRACH) resource dedicated to the mobile device, or an uplink clock synchronization signal dedicated to mobile device.

Clause 30. The method of clause 27, wherein the configuration information of the second subcarrier spacing of the downlink transmission includes at least one of a synchronization signal block (SSB) resource dedicated to the mobile device, a semi-persistent scheduling (SPS) resource dedicated to the mobile device, a clock synchronization signal, a sounding signal, or a reference signal for the mobile device.

Clause 31. The method of any of clauses 27-30, wherein the first subcarrier spacing is configured by a master information block (MIB) message or a system information block (SIB) message, and wherein the configuration include a synchronization signal block (SSB) configuration, coreset zero configuration or a physical random access channel (PRACH) configuration.

Clause 32. The method of any of clauses 27-30, wherein a resource of the second subcarrier spacing is configured by a radio resource control message or a medium access control (MAC) control element.

Clause 33. A data communication method, comprising: transmitting, to a communication node, information for establishing or modifying a protocol data unit session, and transmitting, to a mobile device, a signaling message for indicating a quality of service (QoS) identifier.

Clause 34. The method of clause 33, wherein the information includes the QoS identifier configured to indicate a predefined index value associated with QoS characteristics.

Clause 35. The method of clause 33, wherein the QoS identifier is configured to indicate at least one of a priority of QoS flow compared to other traffic flows, a packet delay budget, a packet error rate, a guaranteed flow bit rate (GFBR), or a maximum flow bit rate (MFBR).

Clause 36. An apparatus for wireless communication, comprising a memory and a processor, wherein the processor reads code from the memory and implements a method recited in any of clauses 1 to 35.

Clause 37. A computer readable program storage medium having code stored thereon, the code, when executed by a processor, causing the processor to implement a method recited in any of clauses 1 to 35.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A data communication method, comprising:
   receiving, by a mobile device, from a communication node, time information and an indication whether to perform a propagation delay compensation; and
   performing, by the mobile device, the propagation delay compensation on the time information based on a timing advance value,
   wherein the communication node is divided into a gNB distribution unit (gNB-DU) and a gNB central unit (gNB-CU), wherein the timing advance value used by the mobile device to perform the propagation delay compensation is based on a first time information transmitted from the gNB distribution unit (gNB-DU) to the gNB central unit (gNB-CU), wherein transmitting the first time information from the gNB distribution unit (gNB-DU) to the gNB central unit (gNB-CU) is actively triggered by the gNB distribution unit (gNB-DU) or triggered in response to a request from the gNB central unit (gNB-CU).

2. The method of claim 1, wherein the indication is transmitted through a downlink information transfer message.

3. A data communication method, comprising:
   transmitting, by a gNB distribution unit (gNB-DU), to a gNB central unit (gNB-CU), time information associated with a propagation delay compensation including a timing advance value, wherein transmitting the time information associated with the propagation delay compensation from the gNB distribution unit (gNB-DU) to the gNB central unit (gNB-CU) is actively triggered by the gNB distribution unit (gNB-DU) or triggered in response to a request from the gNB central unit (gNB-CU).

4. The method of claim 3, further comprising receiving, by the gNB distribution unit (gNB-DU), from the gNB central unit (gNB-CU), the request for the time information associated with the propagation delay compensation.

5. An apparatus for wireless communication, comprising a memory and a processor, wherein the processor reads code from the memory and implements a method, comprising:
   receiving, by a mobile device, from a communication node, time information and an indication whether to perform a propagation delay compensation; and
   performing, by the mobile device, the propagation delay compensation on the time information based on a timing advance value,
   wherein the communication node is divided into a gNB distribution unit (gNB-DU) and a gNB central unit (gNB-CU), wherein the timing advance value used by the mobile device to perform the propagation delay compensation is based on a first time information transmitted from the gNB distribution unit (gNB-DU) to the gNB central unit (gNB-CU), wherein transmitting the propagation delay compensation from the gNB distribution unit (gNB-DU) to the gNB central unit (gNB-CU) is actively triggered by the gNB distribution unit (gNB-DU) or triggered in response to a request from the gNB central unit (gNB-CU).

6. The apparatus of claim 5, wherein the indication is transmitted through a downlink information transfer message.

7. An apparatus for wireless communication, comprising a memory and a processor, wherein the processor reads code from the memory and implements a method, comprising:
   transmitting, by a gNB distribution unit (NB-DU), to a gNB central unit (gNB-CU), time information associated with a propagation delay compensation including a timing advance value, wherein transmitting the time information associated with the propagation delay compensation from the gNB distribution unit (gNB-DU) to the gNB central unit (gNB-CU) is actively triggered by the gNB distribution unit (gNB-DU) or triggered in response to a request from the gNB central unit (gNB-CU),
   wherein the apparatus is the gNB distribution unit (gNB-DU).

8. The apparatus of claim 7, wherein further comprising receiving, by the gNB distribution unit (gNB-DU), from the gNB central unit (gNB-CU), the request for the time information associated with the propagation delay compensation.

* * * * *